(12) United States Patent
Chakradhar et al.

(10) Patent No.: US 9,367,346 B2
(45) Date of Patent: Jun. 14, 2016

(54) ACCELERATING DISTRIBUTED TRANSACTIONS ON KEY-VALUE STORES THROUGH DYNAMIC LOCK LOCALIZATION

(71) Applicant: NEC Laboratories America, Inc., Princeton, NJ (US)

(72) Inventors: Srimat Chakradhar, Manalapan, NJ (US); Naresh Rapolu, West Lafayette, IN (US)

(73) Assignee: NEC Corporation (JP)

( * ) Notice: Subject to any disclaimer, the term of this patent is extended or adjusted under 35 U.S.C. 154(b) by 358 days.

(21) Appl. No.: 14/162,901

(22) Filed: Jan. 24, 2014

(65) Prior Publication Data

US 2014/0236913 A1 Aug. 21, 2014

Related U.S. Application Data

(60) Provisional application No. 61/767,088, filed on Feb. 20, 2013.

(51) Int. Cl.
| | |
|---|---|
| G06F 7/00 | (2006.01) |
| G06F 9/46 | (2006.01) |
| G06F 17/30 | (2006.01) |

(52) U.S. Cl.
CPC .......... *G06F 9/466* (2013.01); *G06F 17/30362* (2013.01)

(58) Field of Classification Search
CPC .................................................. G06F 17/30362
See application file for complete search history.

(56) References Cited

U.S. PATENT DOCUMENTS

| | | | | |
|---|---|---|---|---|
| 2009/0276431 A1* | 11/2009 | Lind | ........................ | G06F 9/466 |
| 2012/0102006 A1* | 4/2012 | Larson | .............. | G06F 17/30575 |
| | | | | 707/703 |

* cited by examiner

*Primary Examiner* — Ajith Jacob
(74) *Attorney, Agent, or Firm* — Joseph Kolodka

(57) ABSTRACT

Systems and methods for accelerating distributed transactions on key-value stores includes applying one or more policies of dynamic lock-localization, the policies including a lock migration stage that decreases nodes on which locks are present so that a transaction needs fewer number of network round trips to acquire locks, the policies including a lock ordering stage for pipelining during lock acquisition and wherein the order on locks to avoid deadlock is controlled by average contentions for the locks rather than static lexicographical ordering; and dynamically migrating and placing locks for distributed objects in distinct entity-groups in a datastore through the policies of dynamic lock-localization.

20 Claims, 3 Drawing Sheets

ACCELERATING DISTRIBUTED TRANSACTIONS ON KEY-VALUE STORES THROUGH DYNAMIC LOCK LOCALIZATION

This application claims priority to Provisional Application Ser. No. 61/767,088 filed Feb. 20, 2013, the content of which is incorporated by reference.

BACKGROUND

The present invention relates to distributed transactions on key-value stores.

Scalable distributed data-stores are increasingly used for storing large datasets in diverse applications. Scale-out data stores, based on key-value abstractions are commonly used as backend or cloud storage for various applications. Systems like CloudDB, Megastore and Spire support OLTP applications on such stores.

The need for transactional support in these applications has motivated several recent efforts. A common theme underlying these efforts is the creation of disjoint groups of objects (entity-groups) on which efficient local transactional support is provided using multi-version concurrency control. A lock-based protocol is used to support distributed transactions across entity-groups. A significant drawback of this scheme is that the latency of distributed transactions increases with the number of entity-groups it operates on. This is due to the commit overhead of local transactions, and network overhead due to distributed locks.

Key-value stores provide atomic updates of any key. However, many applications that use key-value stores would like to execute transactions that involve multiple keys, rather than just update one key. Distributed transactions on key-value stores exhibit different bottlenecks depending on the degree of lock contention between transactions. Lock acquisition overhead dominates the transaction execution time when the contention for locks is low. Lock-waiting time dominates the transaction execution time when the contention for locks is high.

Locks are typically implemented by augmenting data objects with an "isLocked" field. Using the atomic read-modify-write operation that is natively supported by the key-value stores, a data object can be locked by changing its "isLocked" field value. A transaction acquires the lock on the object before updating it. Although this approach is simple and efficient for modifying a single object, it is not suitable for multi-object distributed transactions. In a scale-out key-value store, data is routinely re-partitioned and re-assigned to other nodes to balance load across the cluster. Such movement of data scatters the locks on different nodes (lock dispersion), significantly increasing lock acquisition overhead. Moreover, re-partitioning of a set of data objects by the underlying key-value store is heavily influenced by their total size, which includes the size of all previous versions of the objects, the size of their indices, and the size of their caches. By grouping data objects and their locks, unnecessary movement of locks is triggered even though these locks do not contribute significantly to the size of the data objects.

Furthermore, lock acquisition is sequential and synchronous (locks must be acquired one by one, in a pre-defined order, to prevent deadlocks), unlike data-updates and lock-releases, which can happen in parallel, and asynchronously.

SUMMARY

Systems and methods for accelerating distributed transactions on key-value stores includes applying one or more policies of dynamic lock-localization, the policies including a lock migration stage that decreases nodes on which locks are present so that a transaction needs fewer number of network round trips to acquire locks, the policies including a lock ordering stage for pipelining during lock acquisition and wherein the order on locks to avoid deadlock is controlled by average contentions for the locks rather than static lexicographical ordering; and dynamically migrating and placing locks for distributed objects in distinct entity-groups in a datastore through the policies of dynamic lock-localization.

Advantages of the preferred embodiments may include one or more of the following. The preferred embodiment with lock migration, and lock-order change significantly speeds up multi-key transactions on key-value stores. We provide a new solution to reduce lock acquisition time, as well as a new solution to dramatically reduce the lock-waiting times. The lock acquisition overhead is reduced: transactions can be written to use as few locks as possible; or concurrency control can be provided by using alternative mechanisms like MVCC that do not use any locks. A total lock-ordering is determined apriori, and the same lock-ordering is in play for all transactions processed by the system. The lock localization service for distributed transaction protocols on scale-out data stores can decrease the average latency of transactions. Lock localization refers to dynamic migration and partitioning of locks across various nodes in the scale-out store to reduce cross partition acquisition of locks. When locks are localized (after separating from their data objects), fewer network round-trips and persistent-writes are necessary to acquire locks. Separating locks from associated data, however, affects the latency of local transactions operating on a single entity-group, since they may need to synchronize with the separated, remote locks. Our M-Lock balances this trade-off using online models that measure relative lock-usage. The system applies lock-localization—locks for distributed objects are dynamically migrated and placed in distinct entity-groups in the same datastore to reduce the overhead of multiple local transactions while acquiring locks. Application-oriented clustering of locks in these new entity-groups leads to a decrease in network overhead. Separating locks from data in this manner, however, affects the latency of local transactions.

DESCRIPTION

Figure 1:
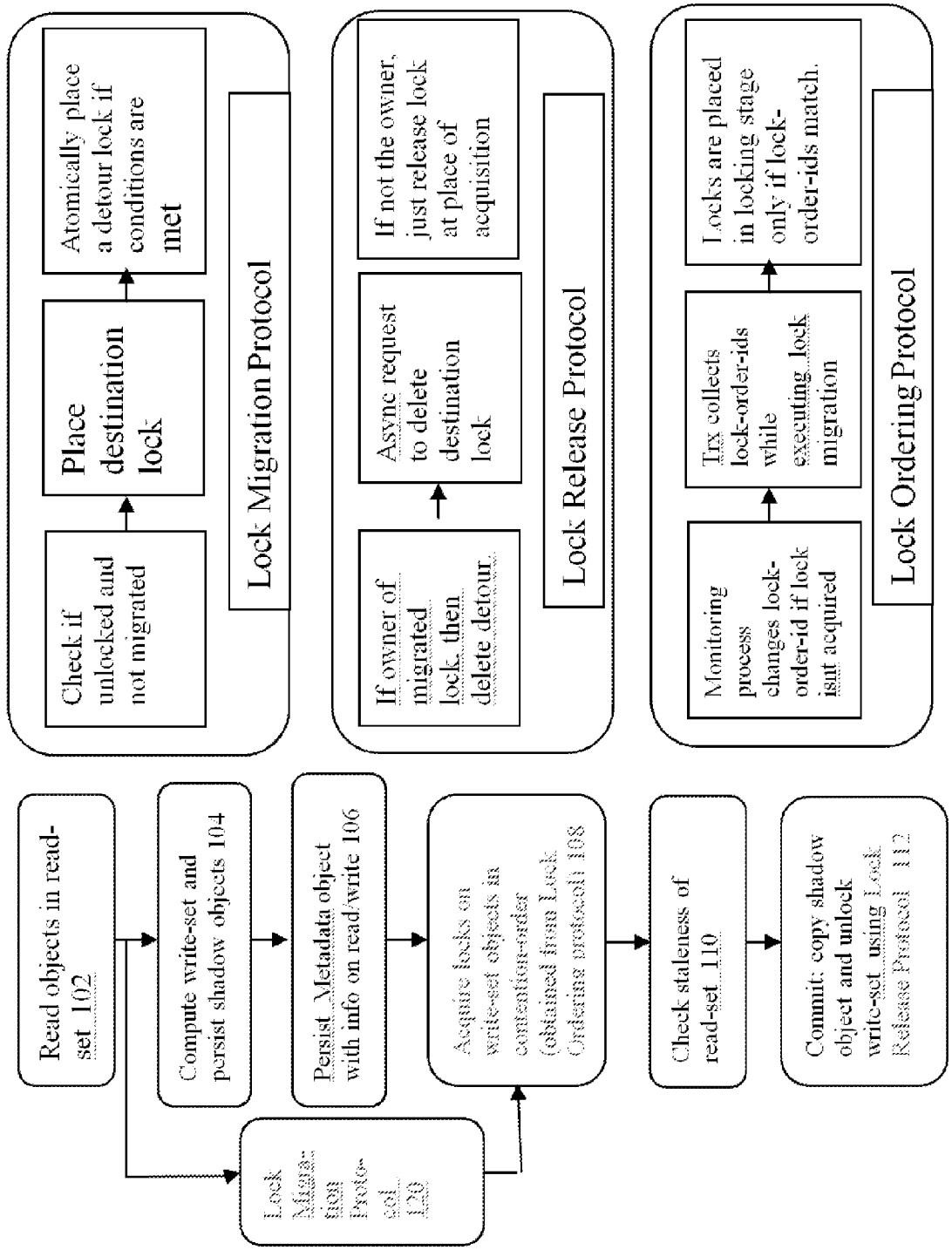
FIG. 1 shows an exemplary process for dynamic lock migration and contention-based dynamic lock ordering, to reduce the overhead of locking.

We briefly review a distributed transaction (DT) protocol that has been implemented on top of the Google App Engine (GAE). The protocol assumes that (a) the objects in the store are partitioned a-priori into entity-groups, and (b) there is a layer of software (local transaction or LT layer) that executes ACID transactions on objects in a single entity-group; for example, GAE uses MVCC for the LT layer.

The DT protocol uses write locks to control concurrent access to data-objects. A write lock is itself an object in the store. A lock-object controls access to one data-object, and is in the same entity-group as the data-object it protects. The DT protocol uses the LT layer for all reads or writes to application and lock-objects in an entity-group. We summarize the major steps, and highlight how the DT protocol leverages the LT layer:

1. Reads: Objects are read directly from the key-value store. These are the initial reads. Their keys form the read-set. The protocol records the version numbers for the read objects.
2. Intercept Writes: Object writes from the transaction are intercepted. Their keys form the write-set.
3. Write to shadow objects: Object writes are recorded in temporary objects, called the shadow objects, until it is safe to reflect the updates in the store. An object and its shadow are placed in the same group. Keys of the shadows form the shadow-write-set.
4. Persist meta-data: The read-set, the write-set and the shadow-write-set are written directly to the store as a transaction-specific object, called the metadata object. This information is used to roll forward the transaction in case of failure.
5. Acquire locks: Write locks are acquired for objects in the write-set, one at a time and in separate LTs, respecting the global ordering of the locks. Every lock is acquired in an LT because an atomic read-check-modify of the lock object is required to acquire the lock. If a write lock cannot be acquired, then the protocol rolls forward the DT that is holding the lock, and the current transaction tries to acquire the lock again.
6. Check validity of reads: By now, all locks have been acquired. Using one LT per entity-group, reads are validated (by comparing the version numbers of the initial reads with the reads inside the LT). If the version information has changed for any object, then the transaction is aborted (the object is now stale).
7. Commit: Shadows are copied into their application objects, write locks are released, and the shadow-objects are deleted.

If a transaction reads and writes objects in only one entity-group, then the entire transaction is attempted within a single LT. There is no need to write shadows, persist meta-data, or acquire locks. The LT checks for the absence of write locks on reads and writes. If write locks are found on objects being written, then the protocol terminates the LT and reverts to the usual distributed transaction (DT) protocol. Otherwise, the LT validates the reads, and then writes the objects. Due to this optimization, a transaction on a single entity group (independent LT) is faster than a DT.

FIG. 1 shows an exemplary process for dynamic lock migration and contention-based dynamic lock ordering, to reduce the overhead of locking. The goal is to decrease the number of network hops needed in the locking stage, and also decrease the wait-times during locking Turning now to FIG. 1, the process reads objects in a read set (102). The process determines a write-set and persists shadow objects (104). The process persists the meta data object with information on the read/write operation (106). The process acquires locks on write-set objects in contention order, as obtained from the lock ordering protocol (108). In parallel, the process applies a lock migration protocol (120) for operations 104-108. From 108, the process checks staleness of the read-set (110) and commits a copy shadow object and unlocks the write-set using the lock release protocol (112).

Figure 2:
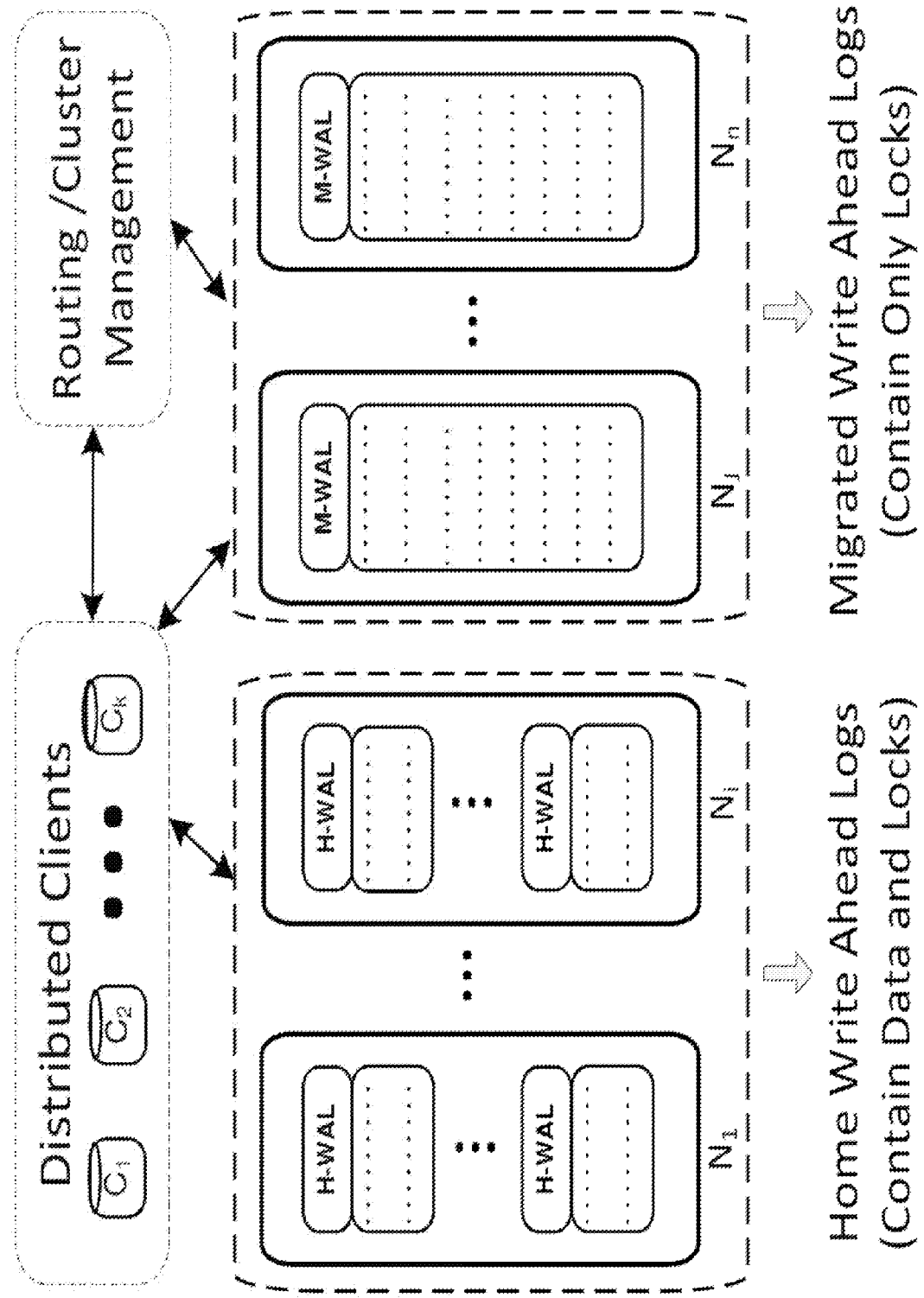
FIG. 2 shows an exemplary Architecture of M-Lock.

FIG. 2 shows the architecture of M-Lock. Each entity-group has data-objects, lock-objects, and a Write-Ahead-Log (WAL) object that is used by the LT layer for atomic commit of data or lock-objects in that group. We refer to this WAL as the Home-WAL (H-WAL). Note that we use the term H-WAL to also refer to the entity-group that the H-WAL object belongs to. The M-Lock service opportunistically moves one or more lock-objects in an entity group to a new entity-group that only has lock-objects. The new group also has an object called the Migrated-WAL (M-WAL) that is used for atomic commit of the lock-objects in that group. Again, we use the term M-WAL to also refer to the new entity-group. Both H-WALs and M-WALs reside on the same store. M-Lock service isolates M-WALs from H-WALs, in a best-effort manner, by placing them on different nodes. Isolation reduces the interference between data and locks with respect to request load and memory usage. Furthermore, the M-Lock service attempts to place locks that frequently co-occur in transactions in the same M-WAL.

To reduce the number of network hops, a protocol dynamically migrates the needed locks onto a single node, before the locking stage. If the migration is successful, the transaction needs to visit only that node to acquire all its locks obviating extra network hops. However, to achieve this, we need to be able to quickly move around just the lock information. Typically, in a datastore storing objects as key-values, the lock information is stored as another field in the same object—locking/unlocking an object implies changing this field using the per-object atomicity property of the store. However, the disadvantage of this setup is that lock movement involves object movement which could be costly due to the large data fields it could possibly contain. We show that if the lock information is removed from the object's contents and stored separately, we can quickly migrate the locks on-demand, while maintaining consistency.

Contention based Lock-ordering: The time-overhead of locking depends on two factors: the number of locks to be acquired and the waiting time. When data contention is low, the probability of conflict is low and so is the wait-time on locks. Hence the network round-trips needed to acquire the distributed locks dominate the total time. On the other hand, in environments with medium to high data contention, the busy-waiting time on locks far exceeds the time taken for sequential locking.

While the ordering required for deadlock-free locking in the waiting version can be any arbitrary total-order, we propose to use data-contention based ordering. In this technique, locks are acquired in the increasing order of their contention.

Distributed protocol for dynamic modification of the lock order: The contention level on locks can be easily tracked by the database monitoring framework.

The following describes a decentralized, distributed, protocol for dynamic modification of the lock order:

1. Every lock object, which stores the lock information of the data object, maintains two fields: lock-version and lock-order-id.
2. Whenever the order of two locks need to reversed, their lock-order-ids are modified accordingly. Further, their lock-version fields are also increased, showing that there is a new order among these locks. Note that a lock object's fields are not altered if it is in the locked state.
3. This changed order on locks is transmitted to the clients as piggybacked information during lock migration. During lock migration, the client needs to visit all the locks that it needs in order to migrate them; at this time, the client can also read the lock-order-id of all locks and use it to order its locks—sort them in the increasing lock-order-ids.
4. There is a possibility that the lock-order might have changed in the time between reading of lock-order-id during lock migration, and the actual locking To avoid any inconsistency, we use the lock-version field to check if the lock-order that the client is adhering to, between two locks, is the same as the one present on the locks, at that moment. If they are different, no locks are granted and the transaction is ordered to abort.

5 Dynamic Lock Protocols

We describe several new protocols that ensure consistent movement of lock-objects between WALs. Policies that determine when and where to move the lock-objects are described in Section 6.

Migration of a lock-object from a H-WAL to an M-WAL involves updates to objects in two different entity-groups. In essence, lock migration is itself a distributed transaction on two different WALs, and our migration protocol must ensure consistency of the transfer of locks. Note that lock migration in M-Lock is a best-effort endeavor: even if some locks cannot be migrated to the M-WAL, the DT will correctly acquire and release its locks. Given a H-WAL and a M-WAL, our lock migration protocol consists of the following steps:

1. If the lock has already migrated, then we inform the application about the new location of the lock, and abort the migration protocol. Also, if the lock is not free, we abort the migration protocol. Only if the lock is free and is in the H-WAL do we execute the next step.
2. We create a new lock object in the M-WAL, and mark the lock as available. However, no other transaction can access this lock until we record the key of the new lock-object in the H-WAL.
3. We record the new location of the lock in the H-WAL, only after checking that (a) the lock in the H-WAL is still free, and (b) the lock has not been migrated by another transaction. These checks are necessary because the lock may have been acquired or migrated by another transaction during the creation of the new lock-object in the M-WAL. Note that these checks, as well as any possible writes involve only one WAL.
4. If either check fails in the previous step, we delete the newly created lock-object from the M-WAL, and abort the migration protocol. Creation and deletion of the newly created lock-object in the M-WAL cannot result in inconsistent operations (reads/writes) because transactions can access the M-WAL only through the H-WAL, and we never updated the H-WAL.

All reads and writes of the lock-objects in M-WALs or H-WALs are performed using the LT layer. The correctness of our protocol depends on being able to do the operations in Step 3, atomically: confirming that the lock-object is in the H-WAL and that it is free, and then placing the location (detour) of the migrated lock-object in the H-WAL. Since these operations only involve one H-WAL, they can happen atomically in an LT, and other transactions will see the lock-object either in an M-WAL or a H-WAL.

In the commit step of the distributed transaction protocol, release of migrated locks merits careful consideration. When there is no lock migration, an update to an object and the release of its lock happen atomically (in an LT) because the object and its lock are in the same H-WAL. However, if a lock has migrated, then the release of the lock happens at its M-WAL, while the write to the object happens at the H-WAL. Furthermore, the update of the object in the H-WAL must complete before the release of the lock. In essence, lock release is also a DT on two different WALs, and our release protocol must ensure consistency.

To accomplish inter-WAL causal operations, we augment a WAL with a persistent queue of causal asynchronous updates. Requests for update of objects under this WAL are written to the WAL as usual. Requests for updates of objects under other WALs are placed in the queue. First, updates to the objects under the WAL are committed. Subsequently, a background thread asynchronously executes requests to update objects under other WALs.

Given a H-WAL and an M-WAL, our lock release protocol is as follows:

1. Update the object protected by the lock, and enqueue a request in the causal asynchronous update queue of the H-WAL to release the lock in the M-WAL.
2. Execute requests in the queue, asynchronously, using a background thread.

The asynchronous update queue ensures the consistency and causality of the following two operations—we update the object before we release the lock on the object.

Visiting appropriate WALs when validating reads is discussed next. In the read step, along with the data object, the client reads lock-object information at H-WAL. If the client finds migration information (M-WAL location) on the lock-object, then in the validate reads step, it visits the M-WAL directly to check for potential locks and stale reads. Note that commit function updates the transaction timestamp on both the lock objects (at H-WAL and M-WAL).

The Lock Repatriation Protocol will undo the migration of a lock. To ensure consistency, we must execute the two operations—deletion of the lock in the M-WAL and the reset of migration information in the H-WAL—as an atomic operation. In essence, lock repatriation is also a distributed transaction on two different WALs. Given a H-WAL and a M-WAL, repatriation consists of the following steps:

1. If the lock is in a released state, then delete the lock from the M-WAL. Otherwise, we abort repatriation.
2. Enqueue a request in the causal asynchronous update queue of the M-WAL (Migrated WAL). This request will reset the migration information for the lock in the H-WAL (Home WAL).

The asynchronous update queue ensures that we delete the lock from the M-WAL before we reset the migration information in the H-WAL. It is possible that a transaction observes the migration of a lock from the H-WAL and redirects itself to the M-WAL only to find that the migrated lock-object in the M-WAL has been deleted. This is analogous to a cache-miss. In such cases, the DT protocol simply aborts and retries the entire transaction.

Locks that are frequently used together by a transaction are localized by M-Lock on a single node in a dynamic, besteffort manner. Lock localization overcomes lock-dispersion by the store, and reduces lock-acquisition latency. FIG. 2 shows the architecture of M-Lock. Each entity-group has data-objects, lock-objects, and a Write-Ahead-Log (WAL) object that is used by the LT layer for atomic commit of data or lock-objects in that group. We refer to this WAL as the Home-WAL (H-WAL). Note that we use the term HWAL to also refer to the entity-group that the H-WAL object belongs to. The M-Lock service opportunistically moves one or more lock-objects in an entity group to a new entitygroup that only has lock-objects. The new group also has an object called the Migrated-WAL (M-WAL) that is used by the LT layer for atomic commit of the lock-objects in that group. Again, we use the term M-WAL to also refer to the new entity-group. Note that M-WALs and H-WALs are stored on different nodes. The M-Lock service attempts to place locks that frequently co-occur in transactions in the same M-WAL.

Performance Implications

Lock Migration—If we add an explicit lock migration step to the distributed protocol, we increase the transaction latency. The challenge is to mask the latency of lock migration. Fortunately, locks are acquired on the objects in the write-set, which is known before the Write to Shadows and Persist Metadata steps of the distributed protocol. Therefore, if lock migration can be executed concurrently with these two steps, then the increase in transaction latency is mitigated. Migration of individual locks can happen in parallel, and the migration time is independent of the number of locks. Only the transaction that migrates the lock may see an increase in latency, while all subsequent transactions that use the lock will not incur the cost of lock migration.

Lock release—After the update of an object, there is a delay in the release of its lock in the M-WAL. This delay does not add to the latency of the transaction. However, the asynchronous release of locks can affect concurrency.

Lock repatriation—There can be a delay between the deletion of the lock in the M-WAL, and the subsequent reset of migration information in the H-WAL. Therefore, a transaction can read migration information in the H-WAL, but find that the lock does not exist in the M-WAL. We abort and restart such transactions. To control such aborts, we suppress repatriation until the demand for the lock declines. We use a threshold time parameter (trelease) that configures the minimum time to wait after the last lock release.

Fault tolerance—For the additional protocols, the safety property relies on the fact that the locks reside either in M-WAL or H-WAL (asynchronous queues included), but not in any other state. The protocols also ensure consistent, decentralized routing information on both the lock objects (at H-WAL and M-WAL). This routing information is also cached at client-side to route subsequent transactions. In the event of a network partition, the DT protocol simply halts until the partitions reconnect. The DT protocol ensures strict consistency (C) and partition-tolerance (P) while forgoing availability (A), in the CAP theorem.

Lock localization is achieved when locks are clustered on M-WALs so that overheads of network round-trips and persistent writes are reduced for the entire set of transactions. One way to achieve this is to infer lock affinity by carefully examining the lock access patterns of transactions. A subset of locks that appear together in several transactions form a cluster, and multiple lock clusters may be evident in a given set of transactions. A graph partitioner is used to partition the graph into multiple sub-partitions. Each sub-partition is given a numeric lock cluster tag. This process of collecting transaction logs and modelling access patterns runs offline on a separate cluster node. Lock cluster tags are stored in a specific system-table, in a compressed format. Clients read this information when they are first spawned and use it to determine the M-WAL on which a lock is to be migrated.

The aim of lock-localization is to place locks belonging to a lock cluster in a single M-WAL. Accordingly, M-Lock assumes that the application specifies a function that maps locks to lock clusters. M-Lock uses this function to assign locks to M-WALs. We note that our approach is similar to locality-sensitive-hashing, where similar data-points (vectors in euclidean space) are hashed to common buckets. Schism generates this map from locks to lock cluster tags using graph partitioning. However, applications can use other static knowledge about the workload to generate the function. For example, frequent players of a game, or team members who collaboratively edit documents, can be grouped statically to create the map. Note that the mapping function could even be approximate. Since M-WALs only have lock-objects, their number is significantly less than H-WALs, thereby achieving lock-localization.

We map lock-objects in H-WALs to M-WALs, as follows. Given a lock-object l, we use the application-specific map function to determine the lock cluster $l_c$. We then construct the key for the migrated lock-object as the concatenation of the lock cluster ($l_c$), the lock (l) and the unique identifier (trx-id) of the transaction that is moving the lock: $l_c$@l@trx-id. We append the unique transaction identifier to avoid conflicts when two transactions attempt to concurrently migrate the same lock-object.

We note two interesting consequences of our key naming scheme. First, if the underlying key-value store is lexicographically range-partitioned, then most if not all of the migrated locks of a lock cluster are in the same M-WAL. If all the locks of a transaction are in a single M-WAL, then we incur the overhead of only one network round-trip, and one persistent write. Second, the global ordering of migrated locks (i.e., the lexicographical ordering of keys of the migrated lock-objects) is different from the global ordering of home locks (i.e., lexicographical ordering of the keys of the lock-objects in the H-WALs, which also happens to be the default global lock ordering for all the transactions). As a result, if a transaction acquires locks as per the global ordering of the home locks, then the transaction may have to visit an M-WAL multiple times to acquire locks in the M-WAL. For example, consider a transaction that acquires three locks l1, l2 and l3, in order. Assume that l1 and l3 belong to the same lock cluster, and that these locks have been migrated to the same M-WAL. Assume that the lock l2 has been migrated to a different M-WAL. During lock acquisition, we first acquire l1 from its M-WAL. Then, we acquire l2 from a different M-WAL, and we re-visit the M-WAL that had l1 to acquire l3!

Re-visiting an M-WAL implies additional network round-trips and persistent writes. To avoid re-visiting an M-WAL, we acquire migrated locks in order, and we acquire home locks in order. Note that it does not matter whether we acquire migrated locks before the home locks or vice-versa, since both approaches will result in a global, total order of migrated and home locks. In our experiments, we acquire migrated locks before home locks. In our example, we acquire locks l1 and l3 by visiting their M-WAL once, and then acquire l2 from a different M-WAL. Note that a transaction simply aborts if it does not find a lock at the WAL it was routed to. This ensures that all clients observe a consistent global order of locks in H-WALs and M-WALs, which prevents deadlocks.

In our design, we have one M-WAL per node. In the context of HBase, an M-WAL corresponds to a region. The actual number of regions (M-WALs) needed to host all migrated locks is dynamically determined by the load-balancer. If the load-balancer detects high average frequency or queuing delay of lock requests for current region placement, it splits a region (M-WAL) into two and moves the splits to different nodes. To maintain clustering, region-splitter should split a region at the boundary of a lock-cluster. An M-WAL has locks from multiple H-WALs. Consequently, each M-WAL has a large number of lock-objects and could potentially receive a large number of concurrent requests for locks.

To efficiently handle these requests, our LT layer for M-WALs is based on fine-grained object latches. This is similar to the use of latches in single-node relational databases. Furthermore, M-WALs are designed assuming that the concurrency control follows the simple deadlock-prevention mechanism based on ordered locking.

On the other hand, the LT layer for H-WALs uses multi-version concurrency control (MVCC). Such a simple lock-free mechanism is sufficient for object requests without heavy contention.

We refer to clustering of lock-objects into H-WALs as the home-clustering, and clustering of migrated lock-objects into M-WALs as the migrated-clustering. Obviously, transactions that are limited to a single H-WAL (referred to as independent LTs, to differentiate them from the LTs that are part of a distributed transaction), benefit from the home-clustering of locks.

Before separation of locks from data, independent LTs commit data in H-WAL by checking for the absence of write-locks on the write-set and ensuring that reads are not stale. This execution involves only H-WAL. However, after lock separation, independent LTs become full-fledged distributed transactions as they need to synchronize between H-WAL and corresponding migrated locks in M-WAL. The additional network round-trips for lock acquisition and version check at M-WALs leads to extra latency. Even if we disable lock-migration for independent LTs, there are other distributed transactions that may be using the same set of locks, and they could have migrated the locks to M-WALs.

A distributed transaction, on the other hand, benefits from migrated-clustering, while the home-clustering increases the latency of such transactions. Therefore, in steady state, lock-localization must balance the trade-off between home-clustering and migrated-clustering to benefit the latency of independent LTs and DTs, respectively. To automatically adapt to the mix and frequency of local and distributed transactions, we define a lock-weight $w_i$ for every lock-object i, which represents the running average of DT proportion in the transaction mix. It is calculated at the end of prescribed intervals, defined as time period during which a fixed number, p, transactions (LT or DT) requested the lock-object. The weight after interval n is defined as follows:

$$w_i(n)=f*w_i(n-1)+(1-f)*(c_{DT}(n)/(c_{DT}(n)+c_{LT}(n))) \quad (1)$$

Here, $w_i(n-1)$ is the lock-weight calculated after $(n-1)^{st}$ interval, f is the fractional importance given to previous weight, $c_{DT}(n)$ is the count of distributed transactions (DTs) encountered in the $n^{th}$ interval, and $c_{LT}(n)$ is the count of independent local transactions (LTs) encountered in the $n^{th}$ interval.

Whenever a DT or an independent LT acquires the lock-object i, we increase the respective count, $c_{DT}$ or $c_{LT}$. At the end of the interval, the lock-weight is updated and counts nullified. If the lock is mostly used by DTs for several intervals, the lock-weight increases, signifying its inclination for migrated-clustering. On the other hand, if LTs use the lock frequently, the lock-weight decreases showing inclination for home-clustering.

Lock migration and repatriation policy is detailed next. In M-Lock, locks are selected for migration or repatriation based on their lock-weights.

Migration policy: If the lock-weight is greater than a pre-set threshold ($w_{high}$), then we migrate the lock. The default threshold is 0.7, meaning that migration should take place if more than 70% of transactions using the lock are DTs.

Repatriation Policy: If the lock-weight of a migrated lock is less than a pre-set threshold ($w_{low}$), then we repatriate the lock. The default threshold is 0.3, meaning that lock should be repatriated if more than 70% of transactions using the lock are independent LTs. We also make sure that there are no transactions that are waiting for the lock, and a pre-set amount of time has elapsed since the last release of the lock. These conditions regulate the probability of a transaction-abort due to a missing lock.

The fraction f specifies the rate at which the lock-weight adjusts to transaction proportions in the past interval. If it is set to a low value, transaction bursts (LT or DT) would significantly alter the lock-weight. This is unfavorable for the system, as it could trigger frequent lock movement. On the other hand, a high value would measure the proportion over several intervals and trigger movement only when there is sufficient evidence of fluctuation in lock usage.

Our evaluation shows that M-Lock is beneficial when workload contains frequent distributed transactions executing on arbitrary entity-groups spread across multiple nodes. Its benefits are limited if the transaction access patterns are known apriori and the data can be statically partitioned to suit them. In such cases, M-Lock can be disabled by the administrator leading to no extra overhead to the baseline system. More importantly, M-Lock enables the programmer to dynamically impose an extra level of clustering (lock-clustering), on top of the data-clustering imposed during creation of entity-groups. Compared to data objects, lock objects are light-weight in terms of size and memory usage. Consequently, lock objects are more suitable for dynamic movement between nodes and localization on a small set of nodes.

M-Lock is also useful to balance the latency trade-off, when there is sufficient skew in the LT-DT transaction proportions. Since M-Lock uses an online model to measure the skew, it is important for the observed skew to persist for a certain duration. If the workload is composed of only local transactions (LTs) on single entity-groups, M-Lock can be simply disabled, reverting the system to its baseline behavior.

Policies for migration and repatriation can be extended to consider the observed latencies of distributed transactions, through a feedback loop. This would further limit the lock movement to only those cases when localization is needed—e.g., when transactions violate SLOs (service-level-objectives), or when other system bottlenecks reduce overall throughput.

Figure 3:
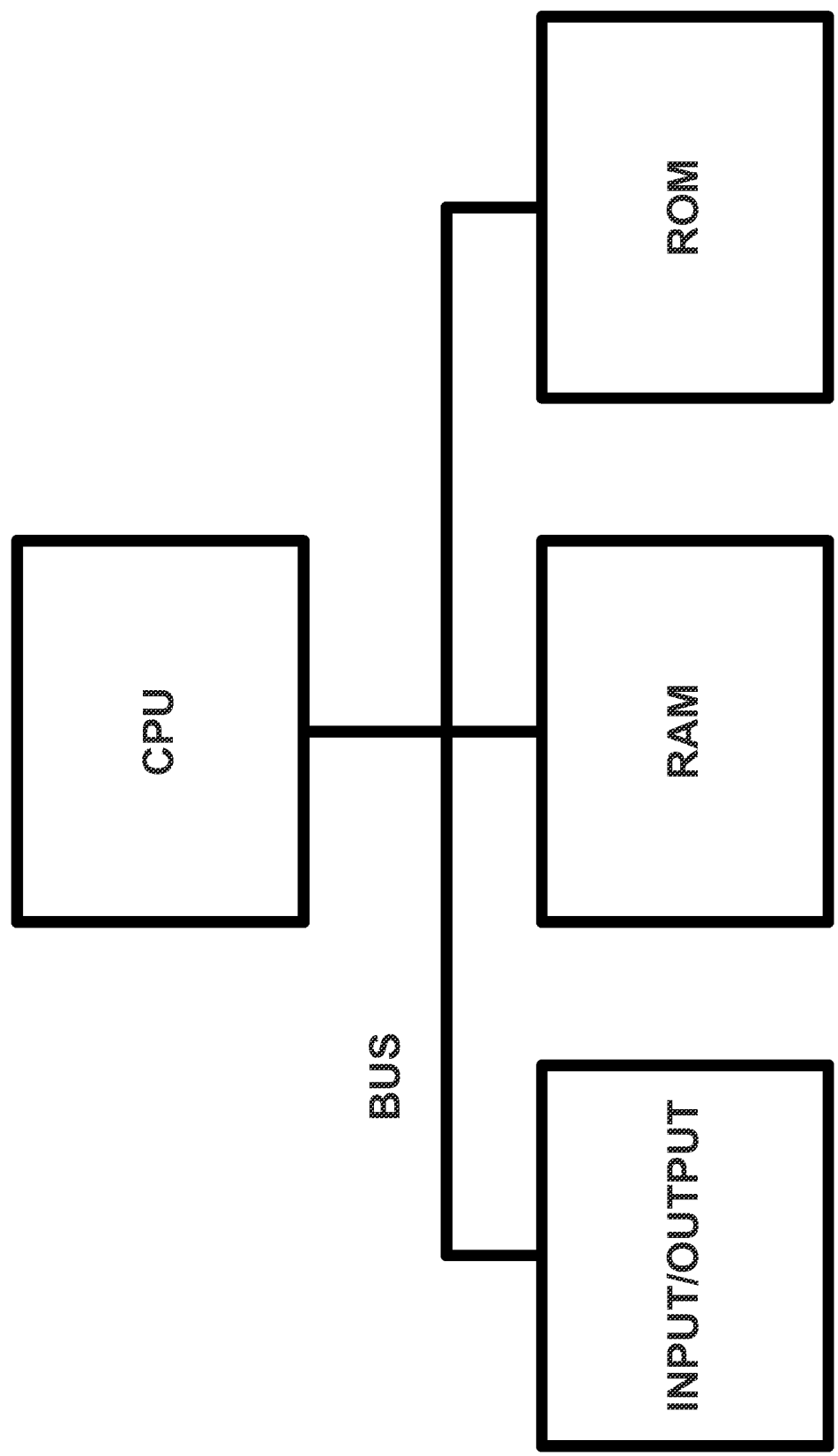
FIG. 3 shows a block diagram of a computer to support the system of FIG. 1.

The system may be implemented in hardware, firmware or software, or a combination of the three. FIG. 3 shows an exemplary computer to execute object detection. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for accelerating distributed transactions on key-value stores, comprising:
    applying one or more policies of dynamic lock-localization, the policies including a lock migration stage that decreases nodes on which locks are present so that a transaction needs fewer number of network round trips to acquire locks, the policies including a lock ordering stage for pipelining during lock acquisition and wherein the order on locks to avoid deadlock is controlled by average contentions for the locks rather than static lexicographical ordering; and
    dynamically migrating and placing locks for distributed objects in distinct entity-groups in a datastore through the policies of dynamic lock-localization.

2. The method of claim 1, comprising applying a lock migration protocol.

3. The method of claim 2, comprising checking if the object is unlocked and not migrated, and if so placing a destination lock and atomically placing a detour lock if conditions are met.

4. The method of claim 1, comprising applying a lock release protocol.

5. The method of claim 4, comprising deleting a detour lock and making an asynchronous request to delete a destination lock if the object is the owner of a migrated lock and otherwise releasing a lock at a place of acquisition.

6. The method of claim 1, comprising applying a lock ordering protocol.

7. The method of claim 6, comprising
    changing a lock order identification if lock is not acquired;
    collecting the lock order identification while executing a lock migration; and
    placing locks in a locking stage for a matching lock order identification.

8. The method of claim 1, comprising applying a decentralized, distributed, protocol for dynamic modification of the lock order.

9. The method of claim 8, wherein every lock object, which stores the lock information of the data object, maintains two fields: lock-version and lock-order-id.

10. The method of claim 8, comprising modifying lock-order-ids and lock-version fields whenever an order of two locks is reversed.

11. The method of claim 8, comprising transmitting changed order on locks to a client as piggybacked information during lock migration.

12. The method of claim 8, comprising using a lock-version field to check if a lock-order that a client is adhering to, between two locks, is the same as the one present on the locks and if different, no locks are granted and the transaction is ordered to abort.

13. The method of claim 1, comprising automatically adapt to the mix and frequency of local and distributed transactions.

14. The method of claim 1, comprising determining a lock-weight $w_i$ for every lock-object i, which represents a running average of distributed transaction proportion in the transaction mix at the end of prescribed intervals as follows:

$$w_i(n)=f*w_i(n-1)+(1-f)*(c_{DT}(n)/(c_{DT}(n)+c_{LT}(n)))$$

where $w_i(n-1)$ is the lock-weight calculated after $(n-1)^{st}$ interval, f is a fractional importance given to previous weight, $c_{DT}(n)$ is a count of distributed transactions (DTs) encountered at an $n^{th}$ interval, and $c_{LT}(n)$ is a count of independent local transactions (LTs) encountered at the $n^{th}$ interval.

15. The method of claim 1, comprising dynamically migrating needed locks onto a single node before the locking stage.

16. A system for accelerating distributed transactions on key-value stores, comprising
    a processor;
    a data storage device; and
    computer code for:
        applying one or more policies of dynamic lock-localization, the policies including a lock migration stage that decreases nodes on which locks are present so that a transaction needs fewer number of network round trips to acquire locks, the policies including a lock ordering stage for pipelining during lock acquisition and wherein the order on locks to avoid deadlock is controlled by average contentions for the locks rather than static lexicographical ordering; and
        dynamically migrating and placing locks for distributed objects in distinct entity-groups in a datastore through the policies of dynamic lock-localization.

17. The system of claim 16, comprising computer code for applying a lock migration protocol.

18. The system of claim 17, comprising computer code for checking if the object is unlocked and not migrated, and if so placing a destination lock and atomically placing a detour lock if conditions are met.

19. The system of claim 16, comprising computer code for applying a lock release protocol.

20. The system of claim 19, comprising computer code for deleting a detour lock and making an asynchronous request to delete a destination lock if the object is the owner of a migrated lock and otherwise releasing a lock at a place of acquisition.

* * * * *